INVENTOR.
ROBERT W. BOGLE

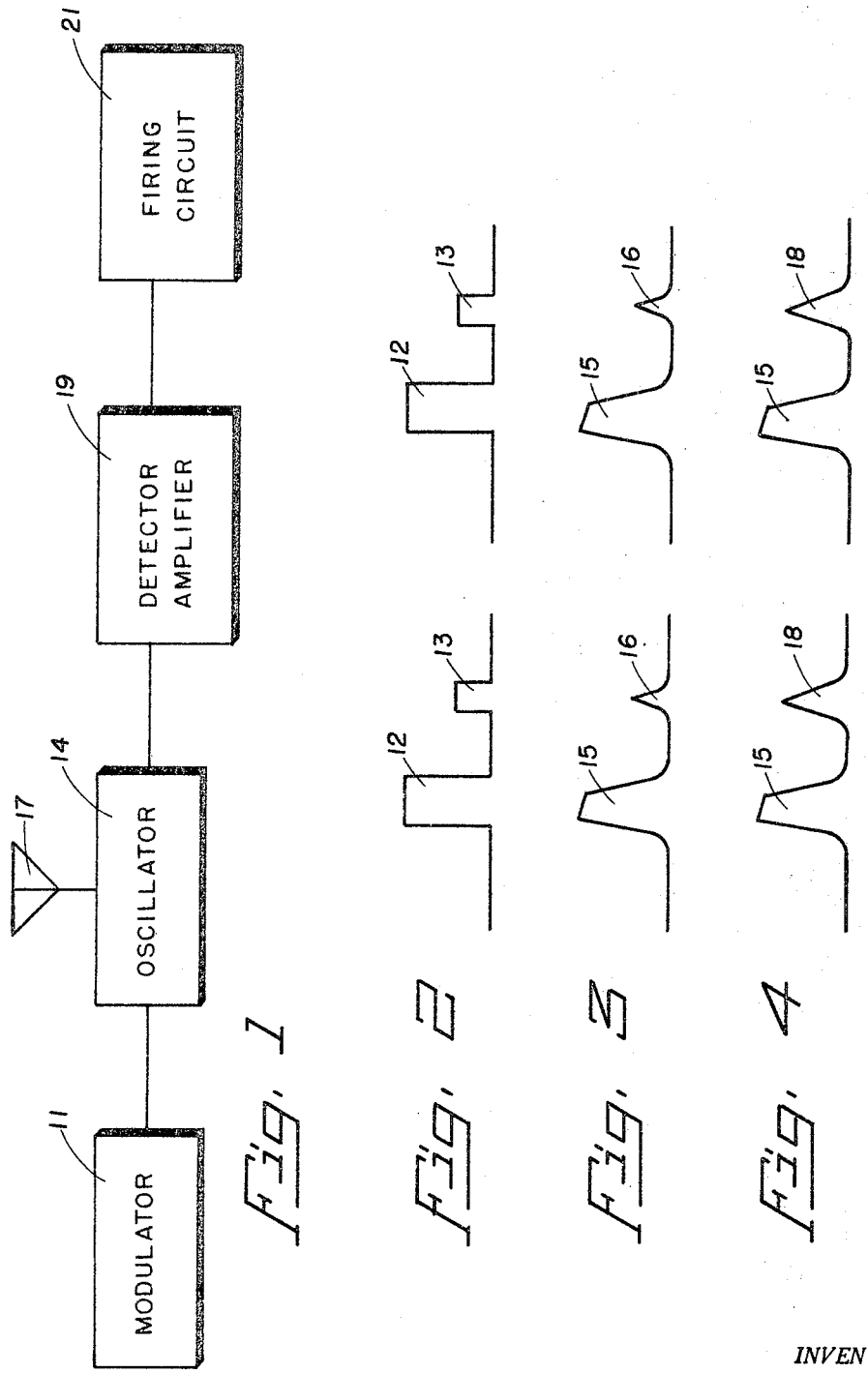

INVENTOR.
ROBERT W. BOGLE

United States Patent Office 3,329,952
Patented July 4, 1967

3,329,952
SUPERREGENERATIVE PULSE RADAR
PROXIMITY FUZE
Robert W. Bogle, Silver Spring, Md., assignor to the
United States of America as represented by the Secretary of the Navy
Filed June 26, 1957, Ser. No. 668,270
3 Claims. (Cl. 343—7)

This invention relates to a superregenerative pulse radar proximity fuze and more particularly to a pulse radar fuze system wherein superregenerative radar principles are applied to a fuzing system by pulsing an oscillator for the purpose of establishing a condition of superregenerative sensitivity to a received echo pulse resulting from reflection of a previous transmitted pulse from a target.

The conventional pulse radar systems include a transmitter which produces short bursts or pulses of radio frequency signal, which after radiation from a suitable antenna may be reflected by a target of some kind. A fraction of the original RF signal is returned to a receiver by way of the same or possibly another antenna after an elapsed time which by the nature of the constant velocity of electromagnetic propagation is exactly proportional to the distance from the radar to the target.

The best known pulse radar systems utilize separate transmitter and receiver sections, the latter usually consisting of a superheterodyne circuit wherein most of the amplification takes place in RF and video stages, whose intelligence bandwidth and inversely gain is determined by the degree of range resolution required. Total gain bandwidth and also the match of the receiver local oscillator and transmitter frequencies are typical problems involved in this type of radar.

The basic principles of the Superregenerative Pulse Radar System disclosed in the present invention is also utilized in a more sophisticated and complex system for an Echo Altimeter or Low Level Guidance System disclosed in the copending application of Robert W. Bogle and William S. Knowles, Ser. No. 668,269 filed June 26, 1957, now U.S. Patent No. 3,088,112.

Certain improvements on the proximity fuze of the present invention are also disclosed in the copending application of R. W. Bogle et al. for a Microwave Superregenerative Pulse Radar, Ser. No. 668,268, filed June 26, 1957, now U.S. Patent No. 3,149,327.

Another previous system relating to object locating and/or distance determining radio systems, and particularly to radio altimeters, utilizes a superregenerative oscillator for transmitting pulses of radio energy and receiving these pulses after reflection from the earth or other reflecting surface. A periodically varying voltage such as a sawtooth voltage, is applied to the oscillator for cyclically varying its blocking rate. Upon reception of reflected pulses, however, the oscillator is locked in momentarily by said pulses when the period of the varying blocking rate gets close to the period required for the transmitted pulses to travel to the reflecting surface and back to the oscillator. The resulting momentary pause in the change in the oscillator pulsing rate due to said block in, is utilized to indicate the pulse reception. This is accomplished by applying the oscillator pulses to a frequency counter and utilizing the counter output to deflect the cathode ray of an indicator tube in one direction and by simultaneously deflecting the cathode ray in another direction along a distance scale. The indication produced on the cathode ray trace by said momentary lock-in gives the distance to the pulse reflecting object or surface.

This prior system utilizing a superregenerative oscillator, however, does not operate on the same principle as the present invention, since it does not utilize a second modulating pulse applied to the oscillator for the purpose of establishing a condition of superregenerative sensitivity to the echo pulse. Furthermore, the prior system noted supra does not derive a basic high range resolution.

The present superregenerative pulse radar fuzing system is based upon the compatibility of pulsing an RF oscillator radar-wise for transmitting an RF signal and subsequently pulsing the same or another oscillator for the purpose of establishing a condition of superregenerative sensitivity to the reflected or return echo pulse received from a target.

Super regeneration is well-known in the art and may be described as a characteristic of an RF oscillator periodically turned on from a quiescent or non-oscillating condition that the rate of growth of oscillations is so affected by the presence of an RF signal of appropriate frequency that output signals representing great effective amplification may be extracted from the oscillator circuit. The mechanistic basis for the amplification is that large changes in the amplitude and duration of the RF pulse envelope are brought about by the influence of very small signals at the critical instant when the oscillation process is first starting to build up.

The manifestation of the changing RF pulse envelope may appear in a number of ways including a change in average tube plate current, change of grid leak bias, or in more sophisticated systems by video representation of the actual RF envelope achieved by means of an RF diode which samples the voltages across the oscillator tank circuit.

While superregeneration is well-known, this principle has not been applied to pulse radar systems to provide a basic high range resolution which is a direct function of intelligence band width. Suitable gain with high band width in more conventional systems is only obtained with complicated amplifiers whereas in the present system disclosed herein, the fundamental improvement in the radar art is provided by obtaining high gain and wide band width in the simple and effective super regenerative RF amplifier.

One object of the present invention is to provide an improved method and means for locating and/or determining the distance to a radio wave reflecting object or surface.

A further object of the present invention is to provide an improved fuzing system, which derives a basic high range resolution through the use of super regenerative amplification.

Still another object of the present invention is to provide an improved pulse radar proximity fuze which obtains high gain and wide band width in a simple and effective superregenerative RF amplifier.

Other objects and many of the attendant advantages of this invention will be readily appreciated as the same becomes better understood by reference to the following detailed description when considered in connection with the accompanying drawings wherein:

FIG. 1 is a block diagram illustrating one preferred embodiment of the present invention;

FIG. 2 is a pulse diagram illustrating the pulse output of the modulator in FIG. 1;

FIG. 3 is a pulse diagram illustrating the pulse output of the oscillator in a quiescent condition and as seen by the detector amplifier;

FIG. 4 is a pulse diagram illustrating the pulse output of the oscillator in the presence of a return signal at the proper range;

Figure 5:
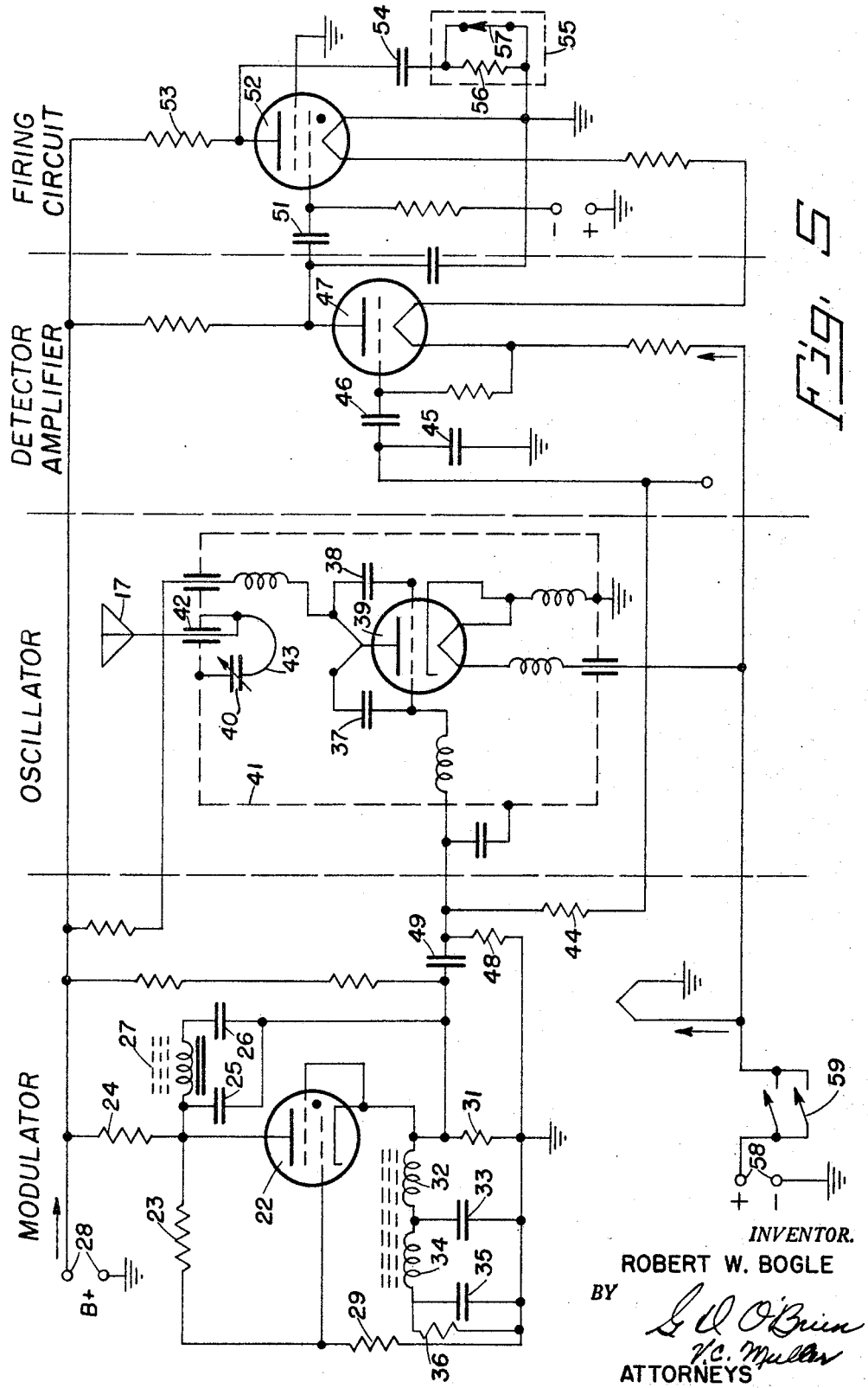
FIG. 5 is a circuit diagram illustrating one preferred embodiment of specific circuitry implementing the block diagram of FIG. 1.

Referring now to the drawings in detail, one preferred embodiment of the present invention is illustrated in block diagram form in FIG. 1 wherein the modulator 11 produces a pair of pulses, such as those illustrated at 12 and 13 in FIG. 2 at a fixed repetition rate to modulate the high frequency output of the oscillator 14.

The first pulse 12 of the modulator 11 is applied to the oscillator 14 and produces a transmitter pulse output of high frequency RF energy, the detected envelope of which is indicated at 15 in the pulse diagram of FIGURE 3. The second or detector pulse 13 from modulator 11, when it is applied to the oscillator 14 in its quiescent or no signal condition, produces a very small RF pulse whose envelope 16 is illustrated in the pulse diagram of FIGURE 3.

When the transmitter pulse output 15 is transmitted through the antenna 17, strikes a target and is reflected back with the echo pulse arriving in the proper time relationship so that it occurs at the beginning of the second modulator pulse 13 it causes a much larger RF output pulse from the oscillator 14, the envelope of which is illustrated at 18 in FIGURE 4.

The large difference in appearance between the first and second RF pulses as illustrated in FIGURES 3 and 4 respectively with a relatively small difference in modulation, is an effect which is desirable in practice and may be achieved by certain adjustments of time constant and the like which are only incidental to the basic principles involved in the present invention.

When an echo of the first RF pulse 15 is returned from a target at the proper distance, the return signal will appear at a time delayed just sufficiently so as to influence the detector pulse 13 applied to the oscillator 14 and cause a much larger RF output pulse 18 as illustrated in FIGURE 4 from the oscillator 14 which is applied to the detector amplifier 19.

The mechanistic basis for the amplification which may be extracted from the oscillator circuit 14 is that large changes in the amplitude and duration of the RF pulse envelope are brought about by the influence of very small signals at the critical instant when the oscillation process is first starting to build up.

The manifestation of the changing RF pulse envelope may appear in a number of ways including a change in average tube plate current, change of grid leak bias, or in more sophisticated systems by a "video" representation of the actual RF envelope achieved by means of an RF diode which samples the voltages across the oscillator tank circuit.

The output signal 16 or 18 from the oscillator 14 is detected and amplified in the detector amplifier circuit 19 and is applied to the firing circuit 21.

The fuze system of the present invention in its basic essentials consists of a pulse modulated, range gate, radar system. Through the use of the principle of superregeneration, the receiver function of this pulse radar system is greatly simplified where the system may be adapted to the limitations of circuit and size required of proximity fuzes for shells and missiles.

A characteristic circuit requirement for superregeneration is uniquely compatible with the basic requirement for pulse radars in general, that is, in each case a source of RF energy must be periodically pulsed on and then off for the function of radar pulsing which is obviously required to provide time resolution, that is to provide a time dependent event whose echo may be subsequently gated and detected. In the case of superregenerative detection, the process of turning on the oscillator brings it through a transient condition in which the oscillator circuit is highly sensitive to the presence of RF signals of compatible frequency. Taking advantage of this compatibility of pulsing, the present system is basically a simple radio frequency oscillator and a switch or modulator which actuates the oscillator according to the following scheme: Referring to FIGURE 2 illustrating the pulse diagram for the modulator 11, it may be stated in radar terms that the pulse 12 represents the transmitter bang or power pulse, and the pulse 13 represents the receiver gate, where the time interval between the beginning of pulse 12 and the beginning of pulse 13 is of a duration commensurate with target ranges of interest. In the case of proximity fuzes, these ranges may be of the order of 100 feet or less with interpulse delays therefor of the order of 0.2 microsecond. The time interval between successive pulses 12 or the repetition period is subject only to the requirement that it be long compared to the time interval between pulses 12 and 13 and yet short enough to provide an adequate rate of information sampling.

If the RF oscillator 14, connected to a suitable antenna system 17 and modulated as described above by the modulator 11, is brought into appropriate proximity with the target, the detector system or the detector amplifier 19 will produce a voltage output, or more specifically a voltage output which is uniquely determined by the presence of the target within the range or distance prescribed by the spacing of the double pulse.

It is characteristic of this system in the various circuit modifications possible, that the absolute output of this detector will be of the order of volts or large fractions of a volt when the target return is of the order of hundreds or even only tens of microvolts. The characteristic sensitivity is such that a simple system, such as the one disclosed herein, will produce a significant detector output while experiencing a radar round trip attenuation of one hundred db or greater.

The application of a double pulse modulation produces a response from the oscillator which is substantially identical for each pulse in so far as the shape of the corresponding RF pulse envelopes. The essential difference lies in the function that each pulse performs. The function of the first pulse is that of providing a burst of energy of short duration whose echo may indicate the presence of a potential target.

The first pulse may indeed demonstrate in itself a sensitivity to an incoming signal, since the basic requirement for superregeneration is being satisfied at the starting of the oscillator. However in the normal radar operation no signal will be present to affect it, thus this first pulse will show no detector operation.

The second pulse, on the other hand, while representing another power pulse, serves no function in this regard but rather serves only in its detector sense, responding to the incoming echo from the first pulse where it is present at the appropriate time, namely at or during that short interval when the oscillatory circuit is brought into a negative resistance condition by reason of the rising tube grid voltage but has not actually broken into oscillation.

In order to describe clearly the function of the detector pulse, a brief review of superregeneration is in order at this point. First it should be noted that the actual manifestation of a detected signal is the increase in duration, amplitude, or both of the envelope of the second or detector pulse. In the present system, the quiescent or unranged pulse amplitude is approximately 10 volts and the increase as a result of detecting an RF signal of a few microvolts or more will be of the order of one volt. This very sizeable change may be recognized in a variety of ways to be discussed later, but generally involves peak rectification in some manner.

The great amplification responsible for such a large voltage change with so small an input is the essence of superregeneration. This amplification is the result of the great susceptibility of the oscillator circuit to the effects of incoming signals during the first short interval after the oscillator is turned on. Following the brief instant during which the rising modulation voltage has brought the tube and its associated circuit into a regenerative condition, the oscillation amplitude will rapidly grow from the value of RF voltage across the tank at that instant.

In the absence of signal, this voltage is provided by the random noise inherent in all circuits and determined by band width, the temperature, etc. For the oscillator of the present invention, this voltage is of the order of ten microvolts on an RMS basis.

For detection, the incoming signal may only exceed the noise level to take over the function of starting the oscillator and on the average higher signals will start the oscillations sooner. In the present system, the modulation signal on the modulator 11 turns off the oscillator before oscillation is built up to saturation amplitude. On this basis a larger input causes earlier starting or less delay, and hence allows oscillations to build to a higher amplitude. As noted this results in an RF pulse envelope change whose rectification may result in volts of output change for a nominal signal input.

It will be apparent that the transfer function of input versus output indicates that the latter is a logarithmic function of the former. To over simplify the fact slightly, this results in a saturation of output for very large input signals and this is generally advantageous in the fuze application.

As in the case of all pulse modulated radar systems a minimum range of operation is exhibited in that a finite time interval must elapse between the end of the transmitter pulse and the start of the receiver pulse or gate. This interval is required by the fact that there exists a finite ringing time for the oscillator during which the oscillations must decrease to a value less than that of the noise or signal level.

Generally it may be noted that while the ringing time may be reduced by damping, i.e. increasing the load on the oscillator, a point is reached where further loading adversely affects the time of starting or oscillation buildup. Under conditions of excessive damping the oscillator 14 on its transmitter pulse function will not produce outputs of sufficient size.

Time dependent damping may be utilized to provide material gains in reduction of minimum range.

Referring now to the circuit diagram of FIG. 5 in detail, the three basic elements of this system namely the modulator 11, RF oscillator 14 and the audio section or detector amplifier 19 have functions as follows. The modulator generates video, double pulses as shown in FIG. 2 at 12 and 13 of precisely determined spacing and relatively well-determined repetition. The oscillator 14 is modulated or keyed in response to the signals from the modulator 11 and in the manner discussed previously produces a change of output in accordance with the existence or absence of a target. This output which is a dynamic situation appears as a unipolar transient pulse is amplified by the amplifier 19 and applied to the grid of the squib firing thyratron in the firing circuit 21.

*Modulator*

The modulator may be considered as formed by the super position of a relaxation circuit which determines the repetition frequency and a pulse circuit which generates the video pulses.

With reference to FIG. 5 the thyratron 22 with its anode resistor network, including resistors 23 and 24 and condensers 25 and 26 with inductance 27, form a conventional relaxation oscillator generating a sawtooth waveform having the desired repetition frequency of approximately 5 to 10 kilocycles. During the charging cycle, when thyratron 22 is non-conducting, the voltage across condensers 25 and 26 rises exponentially toward an asymptotic limit slightly less than the B plus voltage. This limiting voltage is determined by applying Thevenin's theorem to the non-transient network consisting of a battery adapted to be connected to the terminals 28 and resistors 23, 24 and 29. The use of this theorem also yields an equivalent charging resistance of approximately 200,000 ohms, being the combination of resistance 24 in parallel with resistance 23 and 29. For this calculation, it should be noted that resistance 29 is shorted by the thyratron grid current for a negligibly short portion of the repetition period.

The thyratron 22 fires when its instantaneous anode and grid potentials (both measured with respect to its cathode) reach values coincident with the control characteristic locus of the particular tube. The instantaneous grid to cathode potential at this time is negative and is equal to the voltage drop across resistance 29 minus the cathode bias across resistance 31. If desired, a C bias battery may be utilized for bias on the thyratron 22 in place of the potential divider illustrated.

The application of a sawtooth waveform to the grid of tube 22 stabilizes its firing with respect to time, in the presence of variations in tube characteristics, circuit components, and supply voltages.

The first of the two desired output pulses is generated across the resistance 31 by the discharge of condenser 26 through thyratron 22, inductance 27 and resistance 31. The second pulse is an echo of the first through the two section lumped delay line consisting of the inductance 32, condenser 33, inductance 34 and condenser 35, the use of two sections minimizes the deterioration of the original pulse. The termination of this line in the resistance 36 permits convenient adjustment of the second pulse, ranging from approximately 90% of the amplitude of the first pulse 12 through 0 to a negative value. The mutual coupling between inductance 32 and inductance 34 provides a more uniform time delay and prevents deterioration of the pulse waveform. The negative mutual coupling of the same value between condenser 25 and condenser 26 was found to be very important in reducing the interpulse amplitude and in providing some sharpening of the pulse waveforms.

*Oscillator*

The basic circuit used in the oscillator is that of the ultra-audion, which is fundamentally a Colpitts circuit wherein the grid feedback ratio is determined by the tube interelectrode capacities.

The tuned circuit is comprised of two small ceramic condensers 37 and 38, each connected between a grid and plate pin on the tube 39.

The resonant system is placed in the shield can 41 which also houses the UHF oscillator and will be highly excited even with no deliberate coupling provided.

In the present system, a modification of the resonant Lecher system is utilized which consists of a tuning rod 43 bent into the shape of a hairpin and loaded with a small variable condenser 40 which are placed in the shield can 41 which also houses the UHF oscillator working at a compatible frequency. The tuning rod 43 is connected to the antenna 17 through a suitable lead which extends through a sleeve 42 in the shield can 41. The balance of the oscillator circuit consists of conventional condenser, inductance and resistance elements which are commonly used in the ultra-audion or Colpitts circuit.

*Detector amplifier*

Referring now to the detector amplifier section of the circuit diagram in FIG. 5, it will be seen that the signal lead comes from the grid of the RF oscillator tube 39 by means of a simple RC filter consisting of the resistance 44 and condenser 35 and is applied through a coupling condenser 36 to the grid of the detector amplifier triode tube 47.

In this circuit, the signal consists of a negative going increase of oscillator grid leak bias. It will be noted that a fairly sizeable value of resistance should be used for the oscillator grid leak at 48, and the purupose of this is to permit the development of a significant voltage across the resistor and the associated coupling condenser in the connection from the modulator tube 22. The grid leak bias is developed as a consequence of two superimposed AC signals, first the video modulation and second the actual RF voltage. The bias voltage is sufficient in amplitude and the time constant of the grid leak resistor 48 and coupling capacitor 49 is sufficiently long so that the oscillator is biased well below cut-off except at the instant that the positive modulation pulses are applied. By thus utilizing the modulation in itself as a self-biasing source, the switching action of the oscillator is automatically compensated against any variations from unit to unit of either modulator, pulse amplitude or oscillator tube cut-off characteristics. It has been found that different modulators will produce almost identical RF output from a given oscillator.

From the detection standpoint, the amplitude of grid bias also depends upon the amplitude of the RF pulse envelope and since upon detection of a suitable input signal, the RF amplitude of the second pulse 18 is materially increased, the grid bias is accordingly increased negatively. This change represents the output signal.

It is worthy of note that while the changing second pulse lasts for only about 1/2000 of the time, the consequence of a change of its amplitude is manifest as a D.C. or a low frequency signal which may exceed one volt in magnitude.

The purpose of the RC filter in series with the signal output is obviously to prevent the 30 to 40 volt modulation pulses from reaching the audio amplifier. The impedance of this filter is such as to be low compared to the input of the audio amplifier and yet high compared to the modulator output.

In normal operation a steady state voltage of approximately 30 volts negative D.C. will be found at the detector output and to block this an audio blocking condenser 46 is inserted in series with the audio amplifier input.

Other methods may be utilized for extracting the output signal from the oscillator such as plate detection (not shown) or a video system (not shown) which utilizes a crystal detector across the antenna output circuit.

In the present system illustrated in the circuit diagram of FIG. 5 the detected signal is applied to the grid of the triode 47 as a negative transient and its output therefore is the positive signal necessary to trigger the squib firing thyratron 52 and is applied through the coupling condenser 51.

One significant detail of the amplifier circuit including triode 47 is that it must be designed to handle a single transient whose duration in time is determined by the length of the range gate and the relative velocity of target and projectile. Generally speaking, the amplifier must be one which has a relatively wide band pass and the upper frequency limit is determined by the sharpness of the dettector gate (largely by the rise time of the transmitter pulse) and by relative velocity. The lower frequency limit is largely determined by the duration of the transient.

The signal from the firing of the thyratron 52 is taken off across the anode resistor 53 and applied through the coupling condenser 54 to the firing circuit 55 which includes the resistance 56 and the arming switch 57 which is shown in the closed or armed position.

The usual 6 volt D.C. heater voltage is applied across the terminals 58 and through a switch 59 to the heater elements of the tubes 22, 39, 47 and 52 respectively.

The other components of the circuit diagram in FIG. 5 which have not been numbered are conventional elements of circuits of this type which function in the normal manner.

Dual oscillator

Figure 6:
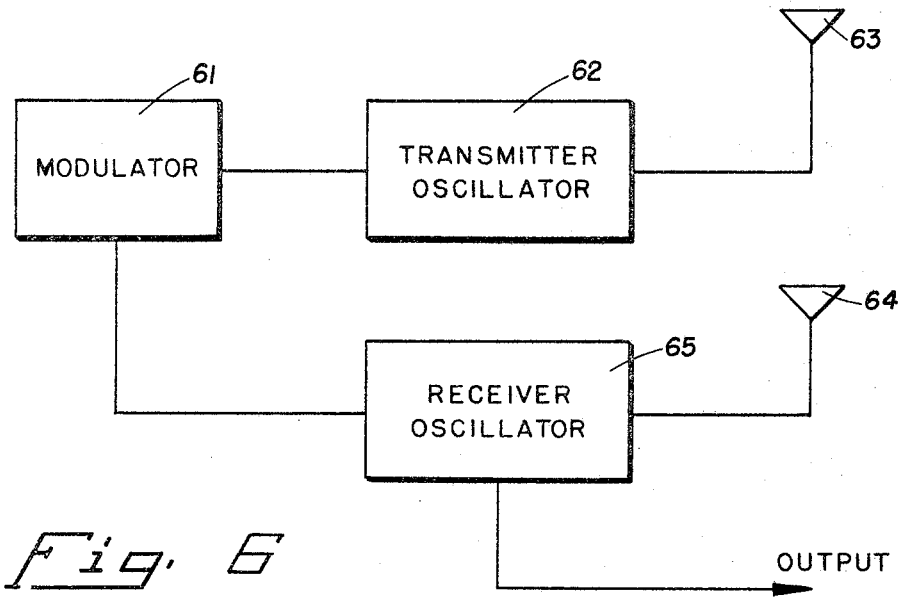
FIG. 6 is a block diagram illustrating one preferred modification of the system of the present invention utilizing a separate transmitter oscillator and receiver oscillator with separate antennas.
Figure 7:
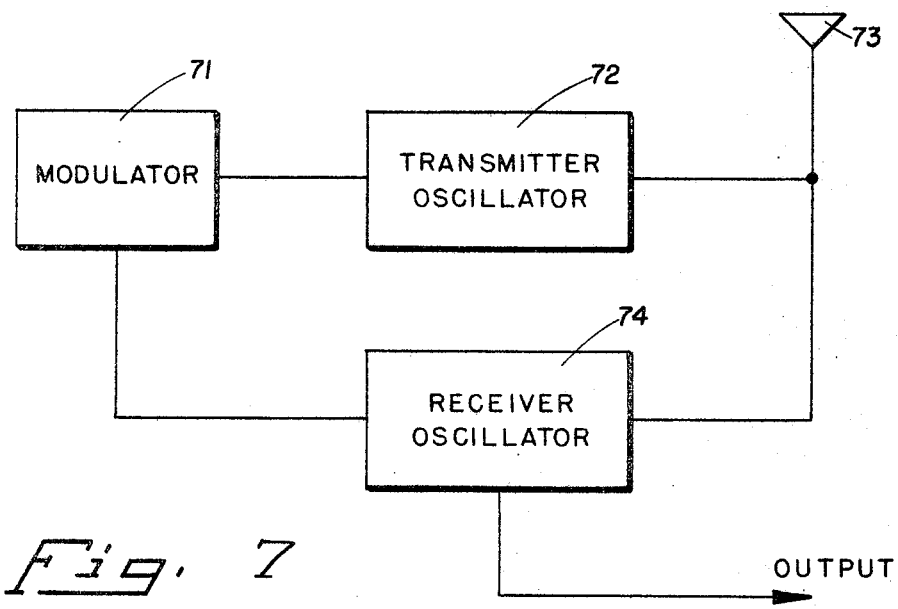
FIG. 7 is a block diagram illustrating another preferred modification utilizing separate oscillators for the transmitter and receiver but utilizing a common antenna.

Two preferred modifications of the fuze system of the present invention are illustrated in the block diagram of FIG. 6 and FIG. 7 respectively wherein two oscillators are utilized. One is pulsed for power transmission and the other, pretuned to the frequency of the first, is subsequently pulsed for gated detection.

These systems are a sophistication of the simple one oscillator superregenerative radar fuze system illustrated in FIGS. 1 to 4 but will function in a somewhat similar manner. However, the double oscillator systems have numerous advantages over the single oscillator system.

One advantage is that pulsing for maximum power output and pulsing for maximum sensitivity generally require some differences in oscillator adjustment and in the two oscillator system the requisite optimizations may be made without compromise of one to the other.

Second, in systems which utilize the video envelope of the RF pulse as primary detector output information, the video gate otherwise required to remove the unchanging transmitter pulse signal is not necessary in the two oscillator system, since a video output may be taken only from the second pulsed oscillator.

Third, a considerable reduction in the minimum range limitation due to transmitter pulse ringing may be expected by the use of two transmission and antenna systems, one for each oscillator, in which an effort is made to isolate the systems electrically for direct path signals but not for signals involved in the path to the target and return.

In the system illustrated in FIG. 6, a modulator 61 generates a pair of pulses, such as the video pulses 12 and 13 illustrated in FIG. 2. The first pulse 12 is applied to the transmitter oscillator 62 which sends out the power pulse or transmitter bang 15 through the transmitting antenna 62. A signal return reflected by the target is received by the antenna 64 and applied to the receiver oscillator 65 which should be pretuned to the frequency of the first or transmitter oscillator 62. A second video pulse 13 from the modulator 61 is applied to the receiver oscillator 65 and if the return signal from the target through antenna 64 is received in the proper time relation to the second pulse 13 a large signal output such as the pulse 18 in FIG. 4 is derived and may be applied to a firing circuit such as that shown in FIG. 5.

The modification of FIG. 7 is similar to the modification illustrated in FIG. 6 except that one antenna is utilized for both transmitting and receiving. In this case the modulator also applied a first pulse to the transmitter oscillator 72 which sends out a power pulse through the antenna 73. The return or echo signal from the target is also received through the antenna 73, but is applied to the receiver and oscillator 74 which also receives a video pulse such as the pulse 13 from the modulator 71 and if the received signal has the proper time relation to the pulse 13 a large signal output such as the pulse 18 is derived which may be applied to suitable firing circuits such as that shown in FIG. 5.

Obviously many modifications and variations of the present invention are possible in the light of the above teachings. It is therefore to be understood that within the scope of the appended claims the invention may be practiced otherwise than as specifically described.

What is claimed is:

1. In a pulse radar proximity fuze, modulator means for generating first and second successive equally spaced pulses of the same frequency, an oscillator coupled to said modulator means and being responsive to said first pulse for producing a first transmitter pulse and responding when in its quiescent condition to said second pulse to produce a second transmitter pulse having an amplitude that is less than the amplitude of said first transmitter pulse, a transmitting and receiving antenna coupled to said oscillator for transmitting said produced pulses and for receiving echoes of said transmitted pulses from a target, detecting means coupled to said oscillator for generating an output pulse in response to a predetermined change in the RF envelope of one of said second pulses caused by an echo of one of said first produced pulse from said target, and means responsive to said output pulse coupled to said detecting means for actuating a fuze.

2. In a pulse radar proximity fuze, modulator means for generating successive pairs of pulses which are equally spaced and of the same frequency, a transmitter oscillator coupled to said modulator means for producing power pulses in response to a first pulse of said pairs of pulses, a transmitting antenna coupled to said transmitter oscillator for transmitting said power pulses to a target, a receiver oscillator tuned to the same frequency as said transmitter oscillator coupled to said modulating means for producing detector pulses in response to the second pulse of said pairs of pulses, a receiving antenna coupled to said receiver for receiving echoes of said power pulses from said target, detecting means coupled to said receiver oscillator for generating an output pulse in response to a predetermined change in the RF envelope of one of said detector pulses caused by an echo of one of said power pulses from said target, and means responsive to said output pulse coupled to said detecting means for actuating a fuze.

3. In a pulse radar proximity fuze, modulator means for generating successive pairs of pulses which are equally spaced and of the same frequency, a transmitter oscillator coupled to said modulator means for producing a power pulse in response to the first pulse of said pairs of pulses; a receiver oscillator, tuned to the same frequency as said transmitter oscillator, coupled to said modulating means for producing detector pulses in response to the second pulse of said pairs of pulses, a transmitting and receiving antenna coupled to said transmitter oscillator and to said receiver oscillator for transmitting said power pulses and for receiving echoes of said power pulses, detecting means coupled to said receiver oscillator for generating an output pulse in response to a predetermined change in the RF envelope of one of said detector pulses caused by an encho of one of said power pulses from said target, and means responsive to said output pulse coupled to said detecting means for actuating a fuze.

References Cited
UNITED STATES PATENTS

| | | | |
|---|---|---|---|
| 2,476,409 | 7/1949 | Free | 343—17.1 |
| 2,498,495 | 2/1950 | Jensen | 343—17.1 |
| 2,532,221 | 11/1950 | Bradley | 343—17.1 |
| 2,913,716 | 11/1959 | Powell | 343—7 |
| 2,962,711 | 11/1960 | Shepard | 343—11 |

FOREIGN PATENTS 585,791  2/1947  Great Britain.

RODNEY D. BENNETT, *Primary Examiner.*

NORMAN H. EVANS, FREDERICK M. STRADER, CHESTER L. JUSTUS, *Examiners.*

M. A. MORRISON, J. CROWELL, R. M. SKOLNIK, T. H. TUBBESING, *Assistant Examiners.*